United States Patent
Anand et al.

(10) Patent No.: US 8,420,564 B2
(45) Date of Patent: Apr. 16, 2013

(54) SULFUR-TOLERANT CATALYST PREPARED THROUGH HIGH PRESSURE DECOMPOSITION

(75) Inventors: Madhu Anand, Bartlesville, OK (US); Joe D. Allison, Fulshear, TX (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 13/236,326

(22) Filed: Sep. 19, 2011

(65) Prior Publication Data

US 2012/0076720 A1 Mar. 29, 2012

Related U.S. Application Data

(60) Provisional application No. 61/385,856, filed on Sep. 23, 2010.

(51) Int. Cl.
*B01J 27/051* (2006.01)
*B01J 37/00* (2006.01)
*C01G 39/06* (2006.01)

(52) U.S. Cl.
USPC ...................................... 502/220; 423/561.1

(58) Field of Classification Search ............... 423/561.1; 502/220
See application file for complete search history.

(56) References Cited

U.S. PATENT DOCUMENTS

| 4,151,190 | A | 4/1979 | Murchison et al. |
|---|---|---|---|
| 4,243,553 | A | 1/1981 | Naumann et al. |
| 4,243,554 | A | 1/1981 | Naumann et al. |
| 4,491,639 | A | 1/1985 | Happel et al. |
| 4,853,359 | A | 8/1989 | Morrison et al. |
| 6,156,693 | A | 12/2000 | Song et al. |
| 6,451,729 | B1 * | 9/2002 | Song et al. ............ 502/220 |
| 2011/0098368 | A1 * | 4/2011 | Anand ............ 518/714 |
| 2012/0215047 | A1 * | 8/2012 | Anand et al. ............ 585/733 |

FOREIGN PATENT DOCUMENTS

EP 216472 1/1987

OTHER PUBLICATIONS

Howard S. Meyer, Vernon L. Hill, Ab Flowers, Gas Research Institute, John Happel, Miguel A. Hnatow, Catalysis Research Corporation, "Direct Methanation—A New Method of Converting Synthesis Gas to Substitute Natural Gas", Gas Research Institute, pp. 109-115.

* cited by examiner

*Primary Examiner* — Timothy Vanoy
(74) *Attorney, Agent, or Firm* — Phillips 66 Company

(57) ABSTRACT

A method of producing a $MoS_2$ catalyst. The method begins by the decomposition of ammonium tetrathiomolybdate in an organic solvent. This decomposition is done in the presence of a solution comprising: a solvent and a promoter, and done under gaseous pressure.

8 Claims, 2 Drawing Sheets

SULFUR-TOLERANT CATALYST PREPARED THROUGH HIGH PRESSURE DECOMPOSITION

CROSS-REFERENCE TO RELATED APPLICATIONS

This application is a non-provisional application which claims the benefit of and priority to U.S. Provisional Application Ser. No. 61/385,856 filed Sep. 23, 2010, entitled "Sulfur-Tolerant Catalyst Prepared Through High Pressure Decomposition," which is hereby incorporated by reference in its entirety.

STATEMENT REGARDING FEDERALLY SPONSORED RESEARCH OR DEVELOPMENT

None

FIELD OF THE INVENTION

A sulfur-tolerant catalyst prepared through high pressure decomposition.

BACKGROUND OF THE INVENTION

The United States natural gas demand is expanding but production is declining and due to that natural gas prices have risen sharply. One method of distributing this energy source is to gasify the coal to produce synthesis gas and then convert it to substitute natural gas via methanation. Current state of the art methanation uses a nickel catalyst which imposes certain operating limitations because of its susceptibility to deactivation by surface carbon and poisoning by surface sulfur.

$MoS_2$ and other sulfur tolerant catalysts based on the transition elements find wide application in the processing of hydrocarbon feedstock's particularly in methanation if they possess sufficient high activity. At present nickel based catalysts are used in methanation because of their high activity, but they are extremely sensitive to deactivation by surface carbon, high temperature and poisoning by various sulfur compounds present in synthesis gas obtained from coal gasification. Sulfur-tolerant $MoS_2$ catalyst can overcome many of the restrictions associated with nickel catalyst. In addition, a recent economic study by Fluor compared sulfur-tolerant methanation with conventional methanation found a 3% reduction in the total plant investment and a 4.5% reduction in the cost of the substitute natural gas plant. The most active sulfur-tolerant catalyst found for methanation in the literature is a $MoS_2$ catalyst initially developed by the Gas Research Institute.

There exists a need to develop a process to create a more active $MoS_2$ catalyst than what is currently available which can be tested in a fixed bed unit and show a high activity for synthesis gas methanation.

SUMMARY OF THE INVENTION

A method of producing a $MoS_2$ catalyst. The method begins by the decomposition of ammonium tetrathiomolybdate in an organic solvent. This decomposition is done in the presence of a solution comprising: a solvent and a promoter, and done under gaseous pressure.

An embodiment is also taught of producing a $MoS_2$ catalyst by first decomposition of ammonium tetrathiomolybdate in an organic solvent in the presence of a solution. The solution contains a solvent of water and a promoter comprising zirconium and elemental sulfur. The temperature of the decomposition is from 275° C. to 475° C. and the pressure the decomposition occurs under a H2 gaseous pressure from 2000 psig to 3000 psig. The $MoS_2$ catalyst has a total CO conversion in synthesis gas methanation greater than 75%.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
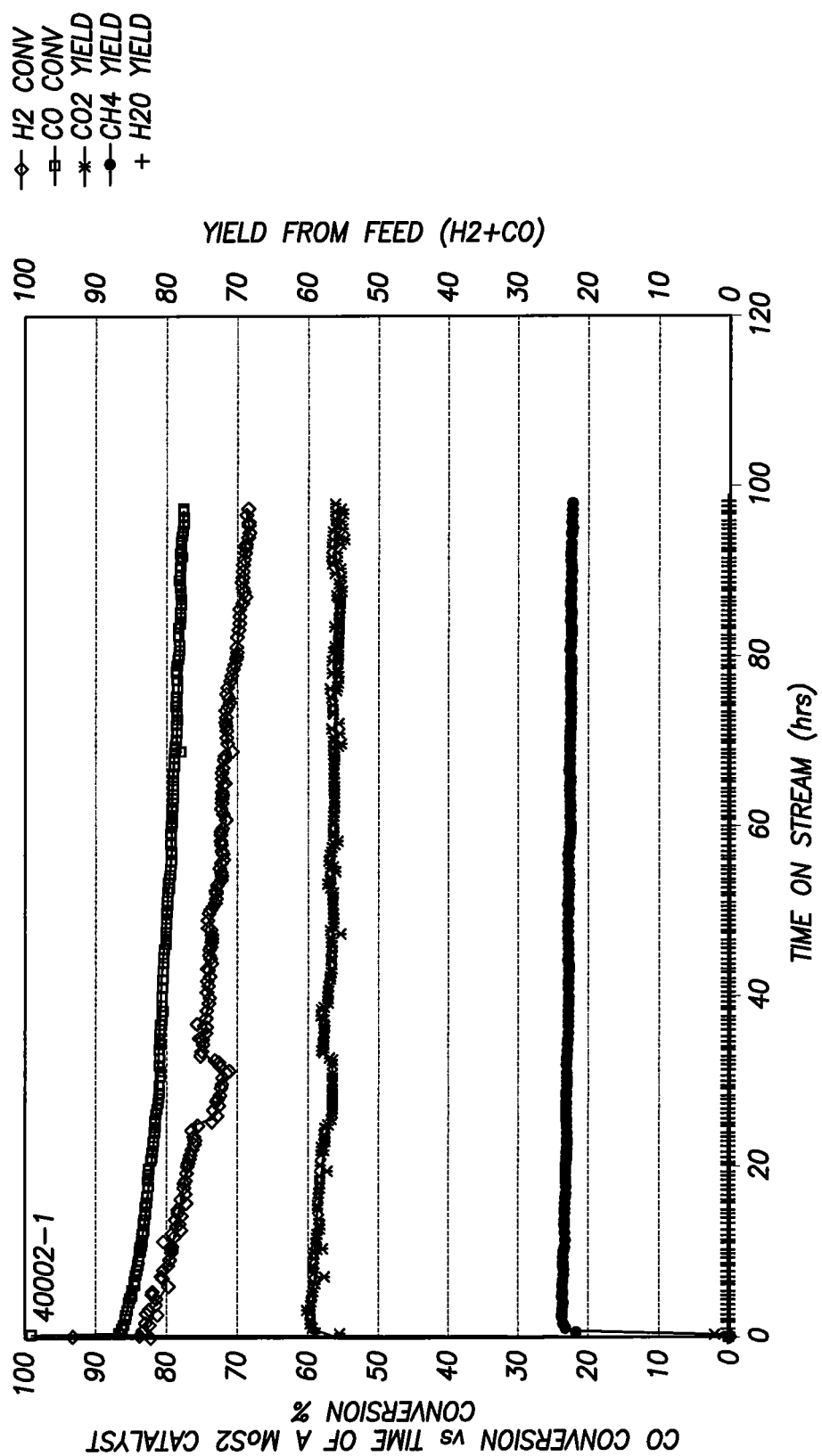
FIG. 1 demonstrates CO conversion of a $MoS_2$ catalyst wherein the gaseous pressure is greater than 2000 psig.

The present embodiment describes a method to produce a $MoS_2$ catalyst. The method begins with the decomposition of ammonium tetrathiomolybdate in an organic solvent in the presence of a solution. The solution can contain a solvent and a promoter. In this embodiment the decomposition occurs under gaseous pressure.

A non-limiting example of the solvent used is $H_2O$.

In one embodiment the promoter contains at least one metal and at least one element from group 16. The metal can be a group 4 metal or specifically zirconium. The element from group 16 can be sulfur. Ideally the ratio of the metal to the at least one element is equal to the molar ratio of the desired $MoS_2$ catalyst.

In yet another embodiment the temperature of the decomposition is within the range of supercritical water such as from 275° C. to 475° C.

In an alternate embodiment the gaseous pressure of the decomposition is within the range of supercritical water such as greater than 2000 psig or from 2000 psig to 3000 psig. The gaseous pressure can be from $H_2$ of $N_2$ gas.

The use of a sulfur toleration catalyst shows significant improvements over conventional methanation because the $MoS_2$ catalyst is more carbon and sulfur tolerant. The total CO conversion though use of the present embodiment can achieve in the synthesis gas methanation greater than 75%, 78% or even 80%.

In one embodiment the organic solvent can be any known organic solvent capable of keeping the ammonium tetrathiomolybdate in solution. In one example the solvent can be tridecane.

The $MoS_2$ catalyst methanates the raw syngas directly using equal molar concentrations of carbon monoxide and hydrogen to form carbon dioxide and water and does not need a water gas shift reaction to increase the syngas ratio resulting in steam usage savings. Since the $MoS_2$ catalyst is sulfur tolerant, sulfur impurities have to be removed only to 4 ppm levels instead of conventional 20 ppb levels to fulfill the requirements of pipeline natural gas. This in turn permits the acid gas removal unit to be smaller.

EXAMPLE 1

A $MoS_2$ catalyst was prepared by the decomposition of ammonium tetrathiomolybdate in an organic solvent such as tridecane in the presence of a solvent of water and dimethyl disulfide. In alternate embodiments different types of sulfur can be used as a sacrificial donor to prevent hydrogen from stripping all the sulfur from the $MoS_2$ catalyst in the form of H₂S. Other sacrificial sulfur donors that can be used include those commonly known in the art and diethyl disulfide, methyl mercaptan and tetrahydrothiophene.

The method begins by loading a 500 mL autoclave with the catalyst precursor ammonium tetrathiomolybdate (4 mg), 60 grams of the organic solvent of n-tridecane and 50 grams of water. The Mo catalyst was modified with a zirconium promoter by adding 1.776 grams of zirconyl hydrate nitrate. 1 gram of dimethyl disulfide was added to prevent hydrogen from stripping all the sulfur from the $MoS_2$ catalyst. 1.538 grams of elemental sulfur was added for catalyst stability.

The sealed reactor was purged with $H_2$ and then pressurized with 150 psi $H_2$ at room temperature. Reactor contents were stirred and heated to 375° C. After achieving 375° C., the final pressure obtained was 2500 psig. Reactor contents were kept at 375° C. and 2500 psig for 1 hour. Although in this example the reactor contents were kept at the reaction conditions for 1 hour other time frames are possible such as from 0.5 to 10 hours, 0.5 to 5 hours or even 1 to 3 hours. After 1 hour, the reactor was cooled and the water vapor, $H_2S$ and $NH_3$ gases generated from ammonium tetrathiomolybdate decomposition were removed from the reactor by venting. The resultant $MoS_2$ catalyst was collected, dried and tested.

To evaluate the catalyst activity, 3.4 of $MoS_2$ catalyst was loaded into a ½ inch stainless steel reactor and the catalyst was evaluated using reaction conditions. For the activity test, a syngas ratio ($H_2$/CO) of 1.08 was selected with a $H_2$ flow at 50.35 cc/min, CO flow at 46.61 cc/min and remaining inerts were substituted with $N_2$ flow at 30.05 cc/min. $H_2S$ was flowing at 1 mol % of the feed gas stream. The products formed from the reaction with the $MoS_2$ catalyst were methane and carbon dioxide.

| Reactant Mixture | |
| --- | --- |
| Temperature, ° C. | 455 |
| Pressure, PSIG | 460 |
| Space Velocity (weight basis) | 2400 |
| $H_2$ | 37% |
| CO | 34% |
| $N_2$ | 28% |
| $H_2S$ | 1% |
| Total CO conversion, % | 86.66% |

FIG. 1 depicts the CO conversion rate of Example 1.

Figure 2:
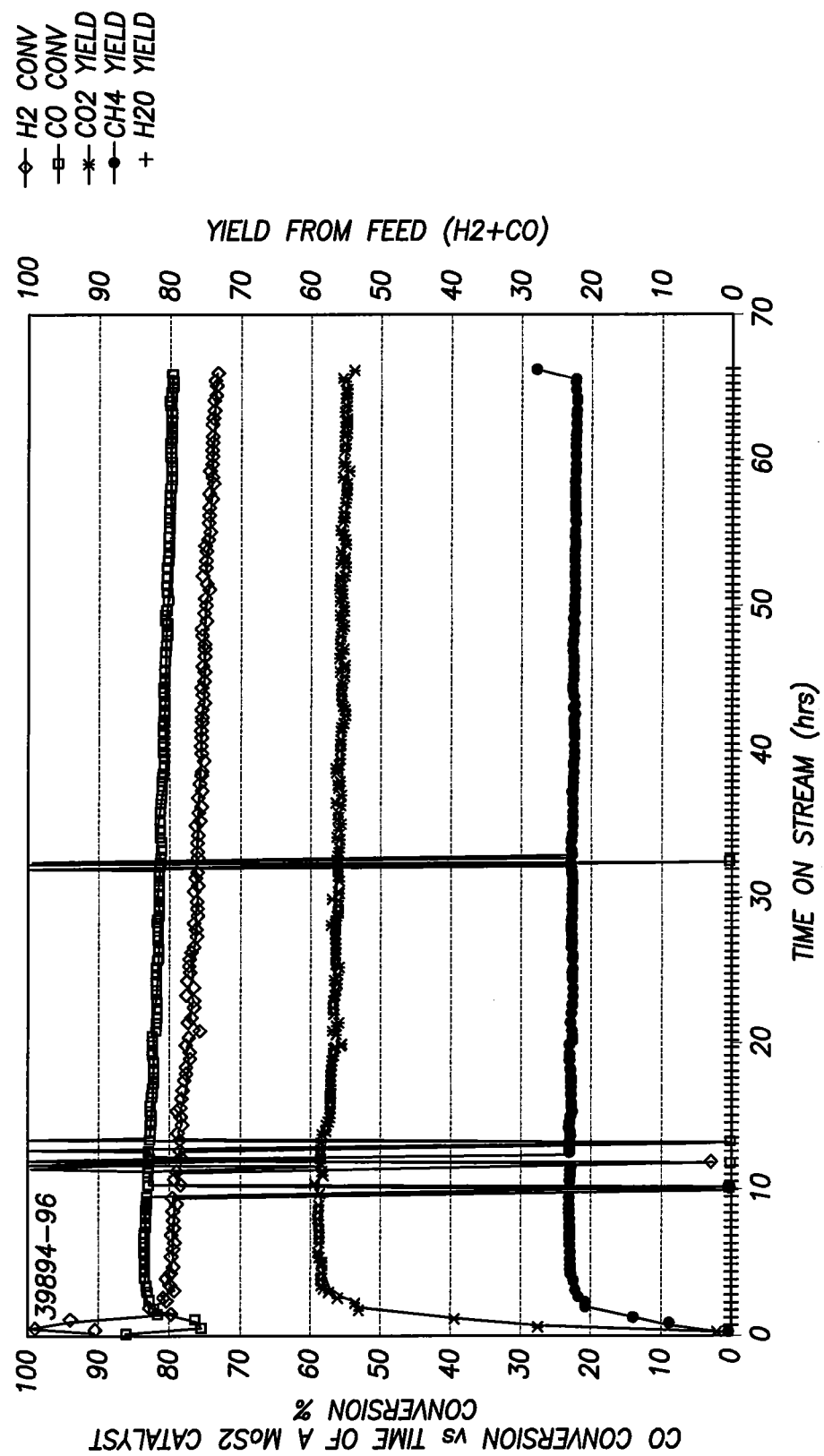
FIG. 2 demonstrates CO conversion of a $MoS_2$ catalyst produced by conventional means.

FIG. 2 depicts the CO conversion rate of a $MoS_2$ catalyst produced from conventional means.

EXAMPLE 2

The following $MoS_2$ catalysts were produced similarly to example 1, except for a difference with the promoter of zirconium and elemental sulfur. The final CO conversion % was taken 48 hours after the experiment

| $MoS_2$ with promoter | Total Pressure (psi) | Surface Area (m²/g) | Initial CO Conversion (%) | Final CO Conversion (%) |
| --- | --- | --- | --- | --- |
| None | 1000 | 202 | 73 | 64 |
| Sulfur | 1000 | 47 | 71 | 70 |
| Zirconium and Sulfur | 1000 | 91 | 83 | 78 |
| Zirconium | 2500 | 233 | 86 | 79 |
| Zirconium and Sulfur | 2500 | 146 | 87 | 78 |

EXAMPLE 3

The following $MoS_2$ catalysts were produced similarly to example 1, except for a difference of the gaseous component and pressure used to produce the $MoS_2$ catalysts. The final CO conversion % was taken 48 hours after the experiment

| Gaseous component | Total Pressure (psi) | Surface Area (m²/g) | Initial CO Conversion (%) | Final CO Conversion (%) |
| --- | --- | --- | --- | --- |
| $N_2$ and $H_2$ | 1000 | 23 | 75 | 73 |
| $H_2$ | 1000 | 66 | 83 | 78 |
| $H_2$ | 1500 | 86 | 85 | 80 |
| $H_2$ | 2000 | 130 | 84 | 81 |
| $H_2$ | 2500 | 146 | 87 | 78 |

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of any reference is not an admission that it is prior art to the present invention, especially any reference that may have a publication date after the priority date of this application.

The invention claimed is:

1. A method comprising:
   decomposition of ammonium tetrathiomolybdate in an organic solvent in the presence of a solution comprising:
      a solvent; and
      a promoter comprising zirconium and elemental sulfur, wherein the decomposition produces a $MoS_2$ catalyst and the decomposition occurs under gaseous pressure.

2. The method of claim 1, wherein the solvent is $H_2O$.

3. The method of claim 1, wherein the temperature of the decomposition is from 275° C. to 475° C.

4. The method of claim 1, wherein the gaseous pressure of the decomposition is greater than 2000 psig.

5. The method of claim 1, wherein the gaseous pressure of the decomposition is from 2000 psig to 3000 psig.

6. The method of claim 1, wherein the decomposition occurs under the gaseous pressure of $H_2$.

7. The method of claim 1, wherein the $MoS_2$ catalyst has a total CO conversion in synthesis gas methanation greater than 75%.

8. A method comprising:
   decomposition of ammonium tetrathiomolybdate in an organic solvent in the presence of a solution comprising:
      a solvent of water; and
      a promoter comprising zirconium and elemental sulfur, wherein the temperature of the decomposition is from 275° C. to 475° C. and the pressure the decomposition occurs under a $H_2$ gaseous pressure from 2000 psig to 3000 psig, to produce a $MoS_2$ catalyst having a total CO conversion in synthesis gas methanation greater than 75%.

* * * * *